United States Patent
Bansleben et al.

[11] Patent Number: 6,143,857
[45] Date of Patent: Nov. 7, 2000

[54] LINEAR VINYLENE CARBONATE/1-OLEFIN COPOLYMER AND ARTICLES FORMED THEREFROM

[75] Inventors: Donald Albert Bansleben, Columbia, Md.; Stefan Kilian Friedrich, Veitshohheim, Germany; Robert Howard Grubbs, South Pasadena, Calif.; Robert Tan Li, Houston, Tex.; Chunming Wang, Belle Mead, N.J.; Todd Ross Younkin, Pasadena, Calif.

[73] Assignee: Cryovac, Inc., Duncan, S.C.

[21] Appl. No.: 09/274,379

[22] Filed: Mar. 23, 1999

[51] Int. Cl.⁷ .................................................. C08G 64/00
[52] U.S. Cl. .............................................. 528/196
[58] Field of Search ............................................... 528/196

[56] References Cited

U.S. PATENT DOCUMENTS

| | | | |
|---|---|---|---|
| 3,635,937 | 1/1972 | Bauer et al. | 528/176 |
| 3,644,563 | 2/1972 | Bauer et al. | 528/176 |
| 3,647,915 | 3/1972 | Bauer et al. | 528/176 |
| 3,686,159 | 8/1972 | Bauer et al. | 528/176 |
| 4,293,502 | 10/1981 | Beach et al. | 568/9 |
| 4,293,727 | 10/1981 | Beach et al. | 585/526 |
| 4,301,318 | 11/1981 | Beach et al. | 585/526 |
| 4,310,716 | 1/1982 | Beach et al. | 585/526 |
| 4,382,153 | 5/1983 | Beach et al. | 585/526 |
| 4,537,982 | 8/1985 | Starzewski et al. | 528/176 |
| 5,557,023 | 9/1996 | Somogyvari et al. | 585/513 |
| 5,714,556 | 2/1998 | Johnson et al. | 526/135 |
| 5,852,145 | 12/1998 | McLain et al. | 526/133 |

FOREIGN PATENT DOCUMENTS

| | | |
|---|---|---|
| 9623010 | 8/1996 | WIPO . |
| 9830609 | 7/1998 | WIPO . |
| 9912981 | 3/1999 | WIPO . |

*Primary Examiner*—Terressa M. Boykin
*Attorney, Agent, or Firm*—Howard J. Troffkin; Daniel B. Ruble

[57] ABSTRACT

Substantially linear vinylene carbonate/1-olefin copolymers, a process of forming the same, and packaging materials incorporating the same are described. These copolymers are formed by reacting the component monomers in the presence of a single component, non-ionic polymerization catalyst at relatively low temperatures and pressures.

20 Claims, No Drawings

LINEAR VINYLENE CARBONATE/1-OLEFIN COPOLYMER AND ARTICLES FORMED THEREFROM

The present invention was made with United States Government support under Contract No. 70NANB5H1136 awarded by the U.S. Department of Commerce's National Institute of Standards and Technology. The United States has certain rights in the invention.

BACKGROUND INFORMATION

1. Field of the Invention

The present invention is directed to a copolymer of vinylene carbonate and 1-olefins, a process of forming that copolymers, and packaging films containing such polymers.

2. Background of the Invention

Previously reported methods of copolymerizing vinylene carbonate and 1-olefins have been directed to free-radical initiated polymerizations normally carried out at elevated temperature and pressures of greater than about 1000 atm. Such conditions have required the use of, inter alia, elaborate high pressure reactors. See, e.g., R. A. Terteryan et al., *Vysokomol. Soedin.*, 8(10), 1721–1726 (1966) (polymerization using azobisisobutyronitrile as free-radical initiator at elevated temperature and pressure) and S. M. Samoilov et al., *USSR Plast. Massy,* Issue 7, 15–17 (1969) (ethylene-vinylene carbonate copolymers prepared under high pressure conditions having a significant amount of short and long chain branches reportedly could be formed into films, although such branched copolymers generally have properties inferior to those of copolymers having similar composition but a linear architecture).

Other modes of catalytic polymerization, such as those using conventional Ziegler-Natta type catalysts or cationic Group IV metal catalysts, have not produced desired copolymers due to the corrupting effect of vinylene carbonate on such catalyst systems.

Using γ irradiation to graft vinylene carbonate onto the surface of previously formed low density polyethylene (LDPE) films, with an accompanying improvement in hydrophilic properties, is described in, e.g., G. Chen et al., *J. Appl. Poly. Sci.,* 45(5) 853–864 (1992). This technique produces a copolymer distinct from those described above in which the vinylene carbonate is part of the backbone chain of the copolymer.

Producing vinylene carbonate/1-olefin copolymers that are substantially linear and exhibit low polydispersity remains highly desirable. Copolymers having significantly fewer branches can have properties superior to those of copolymers formed by conventional free-radical processes such as, e.g., processing into packaging films and other articles. Further, a process that can produce such copolymers under low temperature and low pressure conditions, which can reduce demand on the needed equipment, also remains desirable.

SUMMARY OF THE INVENTION

The present invention provides a process of forming vinylene carbonate/1-olefin copolymers and substantially linear copolymer products formed thereby (hereinafter referred to as "copolymer"). The process, performed at low temperatures and pressures, involves contacting vinylene carbonate and a 1-olefin in the presence of a nonionic late transition metal bidentate chelate catalyst.

Also provided are packaging film products having at least one layer derived from a blend including the copolymer.

DETAILED DESCRIPTION OF ILLUSTRATIVE EMBODIMENTS

The present invention is directed to a novel process of forming vinylene carbonate/1-olefin copolymers; to the resultant substantially linear copolymer; and to film products having at least one layer containing said copolymer.

The following definitions apply hereinthroughout unless a contrary intention is expressly indicated:

"hydrocarbyl" means a univalent organic group composed of hydrogen and carbon, preferably containing from 1 to 40 carbon atoms;

"hydrocarbylene" means a divalent organic group composed of hydrogen and carbon and which also can include aliphatic and/or aromatic groups;

"hydrocarbyloxy" or "oxyhydrocarbyl" group means a univalent organic group composed of hydrogen, oxygen, and carbon wherein the oxygen may be in the form of one or more ether oxygen, ester oxygen, ketone, aldehyde or carboxylic acid group(s) or mixtures thereof;

"hydrocarbyloxyene" or "oxyhydrocarbylene" means a divalent organic group composed of hydrogen, oxygen and carbon atoms wherein the oxygen atom may be in the form of an ether oxygen, ester oxygen, ketone, aldehyde or carboxylic acid group(s) or mixtures thereof;

"fluorinated" means that one or more hydrogen atoms of a hydrogen-carbon moiety has been substituted by fluorine atoms;

"functional group" means ester, alcohol, carboxylic acid, halogen, primary, secondary and tertiary amine, aldehyde, ketone, hydroxyl, nitro, and sulfonyl groups.

"aryl" and "arylene" mean, respectively, a mono- and divalent carbocyclic aromatic ring or (fused or non-fused) ring system; and "substituted," in reference to moieties, means a moiety that includes one or more groups that do not interfere with the synthesis of the compound or the polymerization process for which the compound is contemplated, wherein such group(s) can be a hydrocarbyl, hydrocarbylene, oxyhydrocarbyl, oxyhydrocarbylene, etc., group.

As mentioned previously, vinylene carbonate/1-olefin copolymers previously have been formed by free radical-initiated polymerization. Copolymers so formed have been highly branched, including a number of long chain branches. Film products incorporating such copolymers have exhibited inferior physical properties, such as tensile strength and modulus of elasticity.

The present invention provides a process of forming a substantially linear copolymer formed from vinylene carbonate and one or more 1-olefins such as ethylene, propylene, 1-butene, and the like. The 1-olefin preferably is ethylene, propylene, or mixtures thereof. The most preferred copolymers are those formed from vinylene carbonate and ethylene. The copolymer can be represented by the formula:

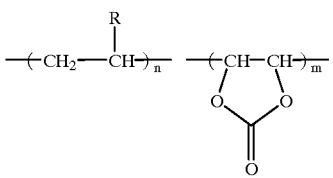

(I)

wherein
R is H or a $C_1$–$C_2$ alkyl group or mixtures thereof; and
n and m are each integers indicating the molar ratio of the polymer units.

The copolymerization is conducted by contacting the monomers in the presence of a single component, non-ionic polymerization catalyst. Catalysts found useful in providing the substantially linear copolymer product are non-ionic (neutral) late transition metal chelates of bidentate salicylaldimine ligands or pyrrolaldimine ligands. These chelates are described in PCT publications WO 98/42664 and WO 98/42665 as well as copending U.S. application Ser. Nos. 09/274,377 (Attorney Docket No. D-43044-01) and 09/274,378 (Attorney Docket No. D-43043-01), the teachings of which are incorporated herein by reference.

The non-ionic late transition metal chelate of a bidentate salicylaldimine ligand is shown below in Formula II:

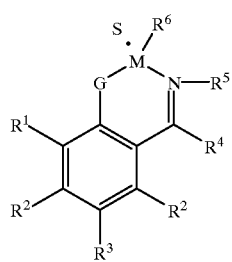

(II)

The non-ionic late transition metal chelate of a pyrrolaldimine ligand is shown below in Formula III:

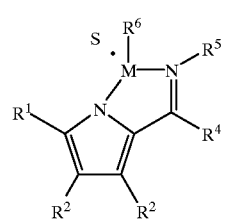

(III)

In these formulae,
$R^1$ is a $C_4$–$C_{24}$ hydrocarbyl, a substituted $C_4$–$C_{24}$ hydrocarbyl which preferably is a sterically bulky hydrocarbyl such as an aryl, substituted aryl, aralkyl or a branched alkyl, a $C_4$–$C_{24}$ hydrocarbyloxy or the $R^1$ group with an $R^2$ group on a vicinal carbon atom together form a hydrocarbylene or hydrocarbyloxyene ring;
each $R^2$ independently is H, a $C_1$–$C_{24}$ hydrocarbyl, a substituted $C_1$–$C_{24}$ hydrocarbyl, an inert functional group, or any two vicinal $R^2$ groups together or with an $R^1$ or $R^3$ group on a vicinal carbon atom together form a hydrocarbylene or hydrocarbyloxyene ring;
$R^3$ is H, a $C_1$–$C_{24}$ hydrocarbyl, a substituted $C_1$–$C_{24}$ hydrocarbyl, an inert functional group, or the $R^3$ group with an $R^2$ group on a vicinal carbon atom together form a hydrocarbylene or hydrocarbyloxyene ring;
each $R^4$ independently is H, a $C_1$–$C_{24}$ hydrocarbyl, or a substituted $C_1$–$C_{24}$ hydrocarbyl;
$R^5$ is a sterically bulky $C_6$–$C_{24}$ hydrocarbyl or a sterically bulky $C_6$–$C_{24}$ substituted hydrocarbyl, preferably methyl or an aryl, aralkyl, or a substituted aryl;
$R^6$ is H, a $C_1$–$C_{11}$ alkyl (preferably a tertiary alkyl, —CRRR, where each R independently is a $C_1$–$C_{12}$ hydrocarbyl, more preferably a $C_1$–$C_3$ alkyl), aryl or substituted aryl, with methyl being most preferred;
G is O (preferred), S, or an —NR group where R is a $C_1$–$C_{11}$ alkyl, aryl or substituted aryl;
S is a coordination ligand or an aprotic polar compound such as
a phosphine as for example triphenylphosphine, tri ($C_1$–$C_6$ alkyl) phosphine, tricycloalkyl phosphine, diphenylalkyl phosphine, dialkyl phenylphosphine and the like,
a tertiary amine as for example trialkylamine,
a $C_2$–$C_{20}$ alkene such as ethylene, propylene, butene, hexene, octene, decene, dodecene, and the like,
a substituted alkene wherein the substituent may be a halogen atom (preferably chloro), an ester group, a $C_1$–$C_4$ alkoxy group, an amine group (—$NR_2$ wherein each R individually is selected from a $C_1$–$C_3$ alkyl); or
an aprotic polar compound (preferred) such as a nitrile (e.g., acetonitrile (most preferred), propionitrile, butyronitrile, benzonitrile, and the like), an ether (e.g., tetrahydrofuran, glyme, diglyme, and the like), or an aromatic heterocyclic amine (e.g., pyridine, 2,6-lutidine, and the like); and
M is a transition metal selected from Fe, Co, Ni, Ru, Rh, Pd, Os, Ir, and Pt in the +2 oxidation state, preferably Ni or Pd, and most preferably Ni.

When the copolymerization is carried out in a conventional slurry process, the above non-ionic chelate catalyst preferably is contained on or bonded to a support material. The support can be an organic or inorganic material having a macromolecular structure. The organic material may be a high molecular weight, inert (to the polymerization reaction and copolymer product) polymer. The inorganic support may be an inorganic oxide such as, for example, silicas, titanias, alumina-silicates, alumina phosphates, aluminas, clays, and mixtures thereof, with silicas or aluminas being preferred and silicas being most preferred. The chelate is preferably bonded through a hydrocarbylene or substituted hydrocarbylene group to a support material. Such supported catalysts are disclosed in copending U.S. application Ser. No. 09/274,377 (Attorney Docket No. D-43044-01) filed concurrently herewith, the teaching of which is incorporated herein by reference.

The polymerization preferably is carried out at a relatively low temperature, i.e., a temperature of from about −100° C. to about 90° C., preferably from about 0° to about 80° C., and most preferably from about 10° C. to about 70° C. with all ranges of temperature within the above being included. Additionally, the polymerization preferably is carried out at a relatively low pressure, i.e., a pressure of from about atmospheric pressure to about 10.5 MPa (about 1500 psig) and preferably from atmospheric pressure to about 7.0 MPa (about 1000 psig) with all ranges of pressure within the above being included.

The polymerization preferably is carried out in a liquid which acts as a medium in which the metal chelate and monomers contact one another. The liquid may be composed of the monomer(s), by itself/themselves or in combination with any organic compound which is liquid at the reaction conditions and inert to the reactants, catalyst, and product(s). Suitable organic liquids include alkanes, cycloalkanes, halogenated alkanes, aromatics, halogenated aromatic hydrocarbons and ethers. Specific useful solvents include hexane, heptane, toluene, xylene, benzene, methylene chloride, chlorobenzene, and tetrahydrofuran. Preferred solvents include toluene, benzene, and methylene chloride.

In addition to an inert liquid medium, the reactuib medium may contain an aprotic polar liquid. Such liquids include, for example, one or more of ethers such as diethyl ether, glyme, diglyme, tetrahydrofuran, and the like; nitrites such as acetonitrile, propionitrile, benzonitrile, and the like; aldehydes or ketones such as acetone, propanone, cyclohexanone, acetaldehyde, benzaldehyde, and the like; alcohols such as methanol, ethanol, propanol, butanol, and the like; organic esters such as ethyl acetate, propyl acetate, ethyl laurate, and the like; nitroorganics such as nitropropane, nitrobenzene, and the like.

The molar ratio of vinylene carbonate to 1-olefin(s) in the monomer feed of the polymerization of the present invention can range from about 0.1:1 to about 25:1 with from about 0.1:1 to 15:1 being preferred. The ratio of monomers to be used as feed depends on the desired ratio of m to n in copolymer (I), supra. The exact ratio of monomers to achieve the desired copolymer can be determined by simple experimentation. The chelate preferably is present in an amount such that the molar quantity of transition metal per deciliter of solvent or its equivalent is from 0.1 to 100 $\mu$mol, with from 1 to 75 $\mu$mol being preferred.

Copolymers formed by this process have been found to have substantially linear structures (excluding the alkyl group derived from the 1-olefin monomer when something other than ethylene is used). The amount of short chain branching usually is expressed in terms of the number of $C_1$–$C_6$ alkyl branches per 1000 carbon atoms. The number of such branches in the copolymer of the present invention range from 0 to about 40 branches, with from about 0 to about 30 branches being readily achieved, and with from 0 to about 10 branches being preferred. Copolymers with very low branching levels (<5 per 1000 carbon atoms) are obtainable. Further, the copolymer is substantially devoid of long chain branches ($C_7$ or longer pendent alkyl groups), i.e., such branches typically number from 0 to about 5 per 1000 carbon atoms, most often from 0 to 1 per 1000 carbon atoms. Branching can be determined by NMR spectroscopy which can provide an analysis of the total number of branches, branch distribution, and to some extent branch length. Alternatively, branch content can be estimated from correlation of total branches as determined by NMR spectroscopy with polymer melting point as determined by differential scanning calorimetry (DSC).

The vinylene carbonate/1-olefin copolymers have a weight average molecular weight ($M_w$) of at least about 10,000. The polydispersity of the copolymer generally ranges from about 1.8 to about 3.

The mole percentage of mer units derived from vinylene carbonate in the resultant copolymer can range from 0.1 to 50 mol % with from 0.1 to 30 mol % being readily achieved. The exact amount depends on the concentration of vinylene carbonate in the polymerization feed stream, the ligand structure of the transition metal chelate, and the polymerization conditions used.

The above copolymer can be formed into articles such as films which can be used in the packaging of a variety of products including food. For example, the copolymer can be used to provide an adhesion promoting (tie) layer in a multilayer packaging film. Packaging articles including a copolymer-containing layer unexpectedly have been found to have enhanced physical properties such as flexibility, toughness, and elongation.

The layer(s) of the packaging article (e.g., film) that contain the subject copolymer can be formed by extrusion, solution casting, injection molding or extrusion/thermoforming processes. When a film includes more than one layer, it typically is formed using co-extrusion, coating, lamination, blow molding, coextrusion/thermoforming, extrusion/coating, or extrusion/lamination processes, such as are taught in U.S. Pat. Nos. 5,350,622 and 5,529,833, the teachings of which are incorporated herein by reference. Of course, such a layer can be formed from a blend that includes one or more other polymers. The copolymer preferably is the major component of the blend, i.e., at least about 60 weight percent, more preferably at least about 75 weight percent, thereof. The other polymer(s) can be any thermoplastic polymer with representative examples including polyvinyl chloride, ethylene/vinyl acetate copolymer, polyethylene terephthalate, polyethylene, polypropylene, and the like. The exact nature and amount of the other polymer(s) can be determined readily by the ordinarily skilled artisan based on the end use, the desired transparency, and the degree of functionality to be exhibited by the packaging film. Because optical transparency is highly desired in the packaging art, any such blend preferably forms a layer which does not substantially detract from the optical transparency of the film.

The layer of the packaging material containing the subject copolymer may be of essentially any thickness, depending on its particular function as part of the end product packaging material (film or semi-rigid or rigid article) as is appreciated by the ordinarily skilled artisan. With respect to films, the thickness can range from about 0.6 to 250 $\mu$m (0.025 to 10 mils), preferably from about 1.3 to 200 $\mu$m (0.05 to 8 mils), and more preferably from about 2.5 to 125 $\mu$m (0.1 to 5 mils). Where the layer containing the copolymer is used as or part of a semi-rigid or rigid article, the layer can have a thickness of from about 0.6 to 250 $\mu$m (0.025 to 10 mils), preferably from about 1.3 to 200 $\mu$m (0.05 to 8 mils).

The composition of the layer comprising the subject copolymer further can contain other components such as pigments; reinforcing fillers; minerals such as clays, exfoliated clays (e.g., nanocomposite utility), mica, talc, and the like; stabilizers such as antioxidants and the like; processing aids; plasticizers; fire retardants; antifogging agents; dyestuff; and non-reinforcing or conductive fillers. The total quantity of said additives generally is less than 10 weight percent, usually less than 5 weight percent, relative to the total composition. The selection of such components depends largely on the material and article to be formed, its method of formation and its contemplated end use.

The packaging material of the present invention can be composed of a single layer or multilayer structure having at least one layer which contains the linear copolymers described above. These copolymers may be crosslinked by actinic radiation and/or oriented by stretching (uni- or biaxially). Thus, a multilayer packaging material may include, in part, a vinylene carbonate-functionalized copolymer as an adhesive (tie) layer and be used in conjunction with a sealant layer wherein the functionality in the sealant layer is selected from carboxylate ester groups or simply LDPE. In many multilayer structures, at least one surface layer (and, optionally, both surface layers) are structural and abuse layers formed from, e.g., an olefinic thermoplastic material such as, for example, polypropylene, LDPE, linear low density polyethylene, and the like. Inner layer(s) between the surface layers can include a gas barrier layer(s), bulk layer(s), and tie layers which enhance interlaminar bond strength between other layers. (Tie layers, when present, can include a copolymer of the present invention, a copolymer of ethylene and (meth)acrylic acid, and/or an anhydride-grafted polyolefin, or can be a conventional adhesive such as a polyurethane (most appropriate where laminate construction is contemplated).

Specific examples of multilayer structures useful as packaging materials include a three-layer structure composed of a gas (e.g., $O_2$) barrier layer, a tie layer including the subject copolymer, and a heat sealable layer which may include an olefin copolymer such as, for example, ethylene/1-olefin copolymers, ethylene/unsaturated ester copolymer (e.g., ethylene/vinyl acetate or ethylene/alkyl acrylate copolymers), and the like; and a four-layer structure composed of the three layers from the foregoing structure with an outer abuse layer, which can include a polyolefin (e.g., polyethylene, polypropylene, or the like), adjacent to the barrier layer.

Multilayer structures also can contain an oxygen-scavenging layer as an inner layer. Scavenger layers typically include a carrier polymer which contains an agent capable of interacting with or absorbing and/or reacting with oxygen from the interior cavity of the formed article. A packaging material incorporating such a layer can have a structure such as, for example, the four-layer structure just described with a scavenging layer between the tie layer and the heat sealable layer.

Objects and advantages of this invention are further illustrated by the following examples. The particular materials and amounts thereof, as well as other conditions and details, recited in these examples should not be used to unduly limit this invention. All parts and percentages are by weight unless otherwise indicated.

EXAMPLES

Example 1

Copolymerization by Neutral Ni(II) Salicylaldimine Complex

In a dry box, a glass pressure bottle was charged with 60 $\mu$mol neutral Ni(II) salicylaldimine complex ($R^1$=9-anthracene, $R^2$=$R^3$=$R^4$=H, $R^5$=2,6-diisopropylphenyl, $R^6$=$CH_3$, S=$CH_3CN$). The bottle was fitted with a mechanical stirrer, a thermocouple, and ports for the addition of liquid and gas. Degassed toluene (85 mL) was added by cannula. Vinylene carbonate (1600 equivalents with respect to the Ni(II) complex) was added as a toluene (5 mL) solution by cannula. The reactor was immediately pressurized to and maintained at 0.72 MPa (90 psig) with ethylene.

The copolymerization was allowed to proceed with stirring for one hour without temperature control. Ethylene gas was vented from the bottle, and the contents of the bottle were poured into acidified methanol. The precipitated copolymer was collected on a frit as a white solid, washed with methanol, and dried under vacuum.

Yield of copolymer was 2.2 g. An FTIR spectrum showed a carbonate C=O stretch at 1818 cm$^{-1}$. The copolymer had a $M_w$ of 83,900 (relative to polystyrene standards) as determined by GPC analysis in trichlorobenzene at 135° C. and a melting point (second heat) of 125.4° C. as determined by DSC.

Example 2

Copolymerization in Presence of Diglyme (Lewis Base) Additive

In a dry box, 0.050 g of 3-(9-anthracene)-substituted neutral Ni(II) salicylaldimine complex ($R^1$=9-anthracene, $R^2$=$R^3$=$R^4$=H, $R^5$=2,6-diisopropylphenyl, $R^6$=phenyl, and S=triphenylphosphine) was added to a glass pressure bottle equipped with a mechanical stirrer assembly, a thermocouple, and addition ports for introduction of liquid and gas. The assembled bottle was removed from the dry box and flushed with ethylene. Dry toluene (90 mL) was added to the reactor by cannula. The reactor was partially immersed in a water bath which warmed the contents to 40° C. After the catalyst had dissolved to give a yellow solution, a solution of vinylene carbonate (1.0 g, 11.6 mmol) in toluene (10 mL) was added through a stainless steel vessel pressurized to about 0.45 MPa (50 psig) with ethylene, and diglyme (9.9 mL) was added in a similar fashion. The ethylene pressure of the reactor was set and maintained at 0.45 MPa (50 psig).

The reaction was allowed to proceed for an hour during which the clear yellow solution changed to an orange cloudy mixture. The reaction was terminated by venting the ethylene pressure and pouring the contents of the vessel into acidified acetone (1 L). The precipitated copolymer was collected on a glass frit by filtration, washed with acetone (2×250 mL), and dried in a vacuum oven.

Yield of white copolymer was 5.15 g. The copolymer was analyzed by DSC and $^{13}$C NMR. The former showed a peak melting temperature of 124.0° C. while the latter showed approximately 0.5 mol % mer units derived from vinylene carbonate.

Example 3

Copolymerization in Presence of Diethyl Ether (Lewis Base) Additive

In a dry box, 0.050 g of 3-(9-anthracene)-substituted neutral Ni(II) salicylaldimine complex ($R^1$=9-anthracene, $R^2$=$R^3$=$R^4$=H, $R^5$=2,6-diisopropylphenyl, $R^6$=phenyl, and S=triphenylphosphine) was added to a glass pressure bottle equipped with a mechanical stirrer assembly, a thermocouple and an addition port for introduction of liquids. The assembled bottle was removed from the dry box and flushed with ethylene. Dry toluene (90 mL) was added to the reactor by cannula. The reactor was partially immersed in a water bath which warmed the contents to 40° C. After the catalyst had dissolved to give a yellow solution, distilled diethyl ether (20 mL) was added by syringe under an ethylene atmosphere. Immediately following addition of the diethyl ether, a solution of vinylene carbonate (1.0 g, 11.6 mmol) in dry toluene (5 mL) was added to the glass reactor in similar fashion. The ethylene pressure of the reactor was set and maintained at 0.45 MPa (50 psig).

The reaction was allowed to proceed with stirring for 30 minutes during which the clear yellow solution changed to an orange cloudy mixture. The reaction was terminated by venting the ethylene pressure and pouring the contents of the vessel into acidified acetone (1 L). The precipitated copolymer was collected on a glass frit by filtration, washed with acetone (2×250 mL), and dried in a vacuum oven.

Yield of white copolymer was 6.84 g. The copolymer was analyzed by DSC and $^{13}$C NMR. The former showed a peak melting temperature of 122.9° C. while the latter showed approximately 1.0 mol % mer units derived from vinylene carbonate.

Various modifications and alterations that do not depart from the scope and spirit of this invention will become apparent to those skilled in the art. This invention is not to be unduly limited to the illustrative embodiments set forth herein.

We claim:

1. A copolymer comprising mer units derived from vinylene carbonate and at least one 1-olefin, said copolymer having from 0 to about 5 long chain branches per 1000 carbon atoms.

2. The copolymer of claim 1 wherein said at least one 1-olefin comprises ethylene, propylene or mixtures thereof.

3. The copolymer of claim 1 wherein said copolymer comprises from about 0.1 to 50 mole percent mer units derived from vinylene carbonate.

4. The copolymer of claim 2 wherein said copolymer comprises from about 0.1 to 50 mole percent mer units derived from vinylene carbonate.

5. The copolymer of claim 1 wherein said copolymer has a weight average molecular weight of at least about 10,000.

6. A copolymer formed by contacting, at a temperature of from about −100° to about +90° C. and a pressure of from 1 atm to about 10.5 MPa, vinylene carbonate and at least one 1-olefin in the presence of a non-ionic late transition metal chelate of a bidentate salicylaldimine or a pyrrolaldimine ligand for a period of time sufficient to cause polymerization.

7. The copolymer of claim 6 wherein said late transition metal bidentate chelate has the formula:

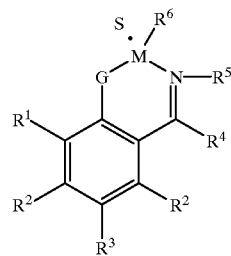

(II)

wherein $R^1$ is a $C_4$–$C_{24}$ hydrocarbyl, a substituted $C_4$–$C_{24}$ hydrocarbyl, a $C_4$–$C_{24}$ hydrocarbyloxy or the $R^1$ group with an $R^2$ which is on a vicinal carbon atom together form a hydrocarbylene or hydrocarbyloxyene ring;

each $R^2$ independently is H, a $C_1$–$C_{24}$ hydrocarbyl, a substituted $C_1$–$C_{24}$ hydrocarbyl, an inert functional group, or any two vicinal $R^2$ groups together or with an $R^1$ or $R^3$ group on a vicinal carbon atom together form a hydrocarbylene or hydrocarbyloxyene ring;

$R^3$ is H, a $C_1$–$C_{24}$ hydrocarbyl, a substituted $C_1$–$C_{24}$ hydrocarbyl, an inert functional group, or the $R^3$ group with an $R^2$ group on a vicinal carbon atom together form a hydrocarbylene ring;

each $R^4$ independently is H, a $C_1$–$C_{24}$ hydrocarbyl, or a substituted $C_1$–$C_{24}$ hydrocarbyl;

$R^5$ is a sterically bulky $C_6$–$C_{24}$ hydrocarbyl or a sterically bulky $C_6$–$C_{24}$ substituted hydrocarbyl;

$R^6$ is H, a $C_1$–$C_{11}$ alkyl, aryl, or substituted aryl;

G is O, S, or an —NR group where R is a $C_1$–$C_{11}$ alkyl, aryl or substituted aryl;

S is a coordination ligand or an aprotic polar compound; and

M is a transition metal selected from Fe, Co, Ni, Ru, Rh, Pd, Os, Ir, and Pt in the +2 oxidation state.

8. The copolymer of claim 6 wherein said non-ionic late transition metal chelate has the formula:

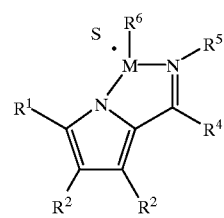

(III)

wherein $R^1$ is a $C_4$–$C_{24}$ hydrocarbyl, a substituted $C_4$–$C_{24}$ hydrocarbyl, a $C_4$–$C_{24}$ hydrocarbyloxy or the $R^1$ group with an $R^2$ which is on a vicinal carbon atom together form a hydrocarbylene or hydrocarbyloxyene ring;

each $R^2$ independently is H, a $C_1$–$C_{24}$ hydrocarbyl, a substituted $C_1$–$C_{24}$ hydrocarbyl, an inert functional group, or any two vicinal $R^2$ groups together or with an $R^1$ or $R^3$ group on a vicinal carbon atom together form a hydrocarbylene or hydrocarbyloxyene ring;

each $R^4$ independently is H, a $C_1$–$C_{24}$ hydrocarbyl, or a substituted $C_1$–$C_{24}$ hydrocarbyl;

$R^5$ is a sterically bulky $C_6$–$C_{24}$ hydrocarbyl or a sterically bulky $C_6$–$C_{24}$ substituted hydrocarbyl;

$R^6$ is H, a $C_1$–$C_{11}$ alkyl, aryl, or substituted aryl;

G is O, S, or an —NR group where R is a $C_1$–$C_{11}$ alkyl, aryl or substituted aryl;

S is a coordination ligand or an aprotic polar compound; and

M is a transition metal selected from Fe, Co, Ni, Ru, Rh, Pd, Os, Ir, and Pt in the +2 oxidation state.

9. The copolymer of claim 7 wherein said at least one 1-olefin comprises ethylene or propylene or mixtures thereof.

10. The copolymer of claim 8 wherein said at least one 1-olefin comprises ethylene, propylene or mixtures thereof.

11. A process of forming a copolymer of vinylene carbonate and at least 1-olefin, comprising:

a) contacting, in the presence of a non-ionic late transition metal chelate selected from a bidentate salicylaldimine and pyrrolaldimine ligand, vinylene carbonate and said at least one 1-olefin in a molar ratio of from about 0.1:1 to about 25:1 at a temperature of from −100° to 90° C. and a pressure of from 1 atm to 10.5 MPa, and b) recovering said copolymer.

12. The process of claim 11 wherein said contacting step is performed in the presence of an aprotic polar compound selected from at least one of a nitrile, an ether, a polyether, an aldehyde, a ketone, an alkanol, an organic ester, and a heterocyclic aromatic amine.

13. The process of claim 11 wherein said chelate is a non-ionic late transition metal salicylaldimine chelate having the formula:

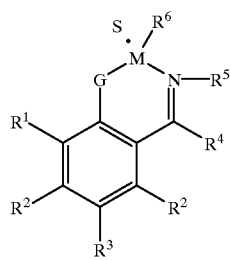

(II)

wherein $R^1$ is a $C_4$–$C_{24}$ hydrocarbyl, a substituted $C_4$–$C_{24}$ hydrocarbyl, a $C_4$–$C_{24}$ hydrocarbyloxy or the $R^1$ group with an $R^2$ which is on a vicinal carbon atom together form a hydrocarbylene or hydrocarbyloxyene ring;

each $R^2$ independently is H, a $C_1$–$C_{24}$ hydrocarbyl, a substituted $C_1$–$C_{24}$ hydrocarbyl, an inert functional group, or any two vicinal $R^2$ groups together or with an $R^1$ or $R^3$ group on a vicinal carbon atom together form a hydrocarbylene or hydrocarbyloxyene ring;

$R^3$ is H, a $C_1$–$C_{24}$ hydrocarbyl, a substituted $C_1$–$C_{24}$ hydrocarbyl, an inert functional group, or the $R^3$ group with an $R^2$ group on a vicinal carbon atom together form a hydrocarbylene ring;

each $R^4$ independently is H, a $C_1$–$C_{24}$ hydrocarbyl, or a substituted $C_1$–$C_{24}$ hydrocarbyl;

$R^5$ is a sterically bulky $C_6$–$C_{24}$ hydrocarbyl or a sterically bulky $C_6$–$C_{24}$ substituted hydrocarbyl;

$R^6$ is H, a $C_1$–$C_{11}$ alkyl, aryl, or substituted aryl;

G is O, S, or an —NR group where R is a $C_1$–$C_{11}$ alkyl, aryl or substituted aryl;

S is a coordination ligand or an aprotic polar compound; and

M is a transition metal selected from Fe, Co, Ni, Ru, Rh, Pd, Os, Ir, and Pt in the +2 oxidation state.

14. The process of claim 11 wherein the chelate is a non-ionic late transition metal pyrrolaldimine chelate represented by the formula:

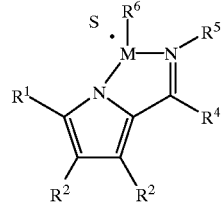

(III)

wherein $R^1$ is a $C_4$–$C_{24}$ hydrocarbyl, a substituted $C_4$–$C_{24}$ hydrocarbyl, a $C_4$–$C_{24}$ hydrocarbyloxy or the $R^1$ group with an $R^2$ which is on a vicinal carbon atom together form a hydrocarbylene or hydrocarbyloxyene ring;

each $R^2$ independently is H, a $C_1$–$C_{24}$ hydrocarbyl, a substituted $C_1$–$C_{24}$ hydrocarbyl, an inert functional group, or any two vicinal $R^2$ groups together or with an $R^1$ or $R^3$ group on a vicinal carbon atom together form a hydrocarbylene or hydrocarbyloxyene ring;

each $R^4$ independently is H, a $C_1$–$C_{24}$ hydrocarbyl, or a substituted $C_1$–$C_{24}$ hydrocarbyl;

$R^5$ is a sterically bulky $C_6$–$C_{24}$ hydrocarbyl or a sterically bulky $C_6$–$C_{24}$ substituted hydrocarbyl;

$R^6$ is H, a $C_1$–$C_{11}$ alkyl, aryl, or substituted aryl;

G is O, S, or an —NR group where R is a $C_1$–$C_{11}$ alkyl, aryl or substituted aryl;

S is a coordination ligand or an aprotic polar compound; and

M is a transition metal selected from Fe, Co, Ni, Ru, Rh, Pd, Os, Ir, and Pt in the +2 oxidation state.

15. The process of claim 13 wherein $R^1$ is an aryl, substituted aryl, aralkyl or a branched alkyl group; each of $R^2$, $R^3$ and $R^4$ is H; $R^5$ is an aryl, substituted aryl, or aralkyl group; $R^6$ is methyl; G is O; M is Ni; and S is an aprotic polar compound.

16. The copolymer of claim 14 wherein $R^1$ is an aryl, substituted aryl, aralkyl or branched alkyl group; each of $R^2$, $R^4$ and $R^6$ is H; $R^5$ is an aryl, substituted aryl, or aralkyl group; M is Ni; and L is an aprotic polar compound.

17. A film comprising one or more layers, at least one of said layers comprising the copolymer of claim 1.

18. A film comprising one or more layers, at least one of said layers comprising the copolymer of claim 2.

19. A film comprising one or more layers, at least one of said layers comprising the copolymer of claim 6.

20. A film comprising one or more layers, at least one of said layers comprising the copolymer of claim 7.

* * * * *